Aug. 21, 1923.
A. C. HOECKER
1,465,305
COMBINED CONTRACTOR AND EXPANDER FOR AUTOMOBILE TIRE RIMS
Filed Sept. 13, 1919
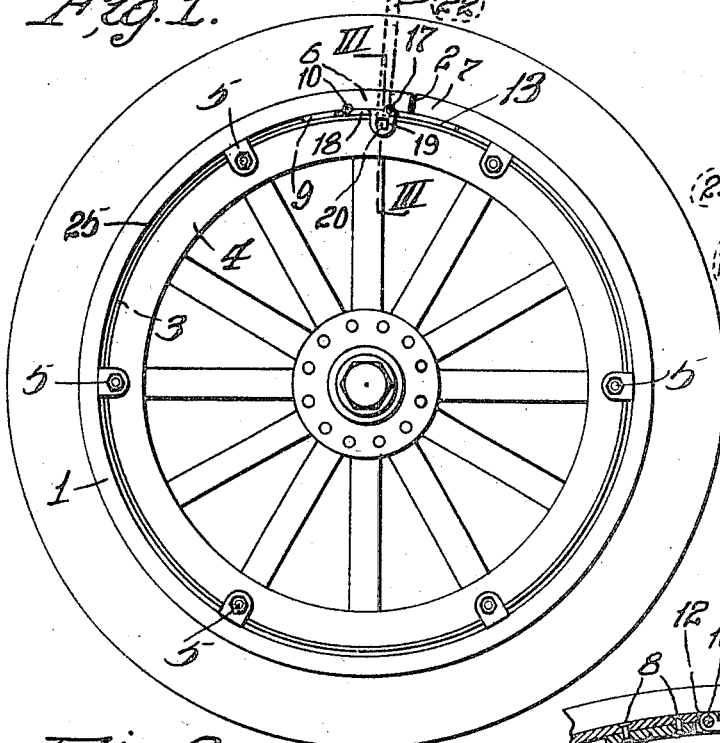
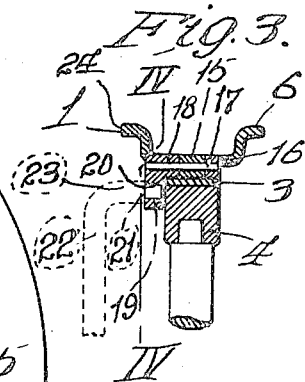
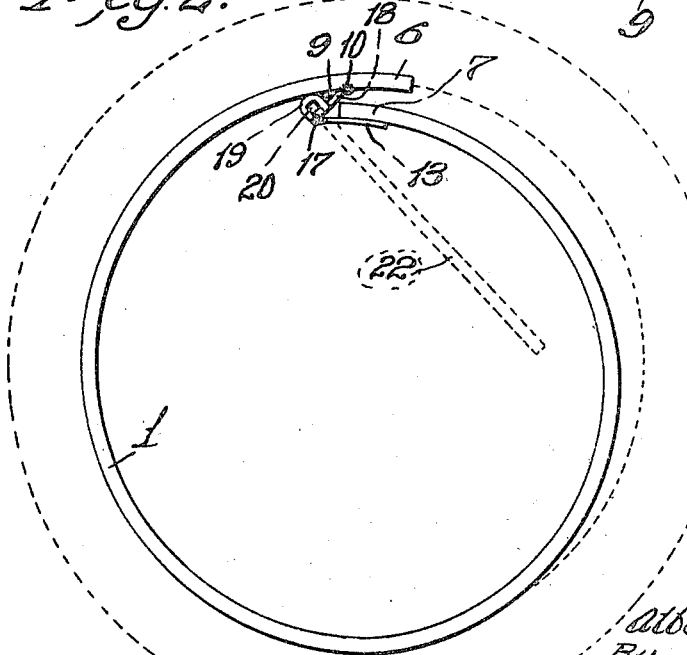
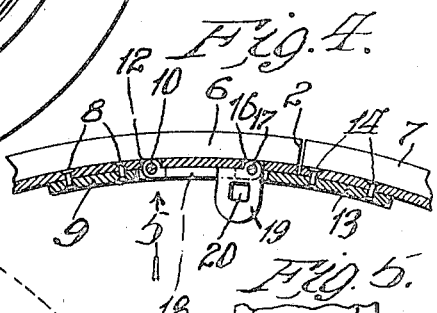
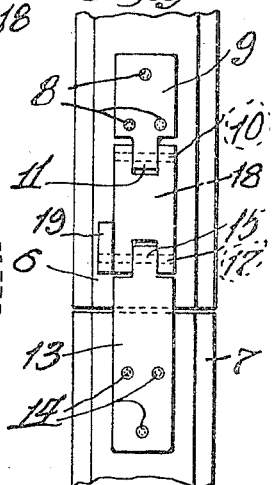
Inventor:
Albert C. Hoecker.
By L. G. Fletcher
atty.

Patented Aug. 21, 1923.

1,465,305

UNITED STATES PATENT OFFICE.

ALBERT C. HOECKER, OF COLLINSVILLE, ILLINOIS, ASSIGNOR, BY MESNE ASSIGNMENTS, TO GARNET FORNEY.

COMBINED CONTRACTOR AND EXPANDER FOR AUTOMOBILE TIRE RIMS.

Application filed September 13, 1919. Serial No. 323,476.

*To all whom it may concern:*

Be it known that I, ALBERT C. HOECKER, a citizen of the United States of America, and a resident of Collinsville, in the county of Madison and State of Illinois, have invented certain new and useful Improvements in a Combined Contractor and Expander for Automobile Tire Rims, of which the following is a specification.

The primary object of this invention is to provide an improved contracting and expanding attachment for automobile tire carrying rims.

Another object of the invention is to provide an attachment for split tire carrying rims which can be applied thereto without any cutting away or changing of the felloe of the wheel or felloe carried rim.

Other and further objects will appear in the specification and be specifically pointed out in the appended claims, reference being had to the accompanying drawings exemplifying the invention, and in which, Figure 1 is a side elevation of an automobile wheel showing a demountable split tire carrying rim mounted thereon, and this improved contracting and expanding attachment applied to the rim.

Figure 2 is a side elevation of a split tire carrying rim showing this improved attachment relative to contracting or reducing the diameter of the rim relative to the tire that is to be mounted or demounted on or from the rim.

Figure 3 is an enlarged cross section taken approximately on the line III—III of Fig. 1.

Figure 4 is an enlarged fragmentary section taken approximately on the line IV—IV of Fig. 3.

Figure 5 is an enlarged inverted fragmentary elevation taken in the direction of the arrow 5 in Fig. 4.

This invention is an improvement of the invention shown in my application filed May 26, 1919, Serial No. 299,763, and as already set forth in one of the aforementioned objects, the improvement resides more specifically in the provision of an attachment which can be applied to a split tire carrying rim without deteriorating or cutting away a portion of the wheel felloe or felloe carried rim.

With reference to the drawings, 1 designates a grooved steel tire rim which is split as designated at 2, said rim being mounted over the felloe carried rim 3 which is mounted on the felloe 4 of the automobile wheel, said rim 1 being mounted in position above the felloe carried rim 3 by the usual removable securing members 5.

In the splitting of the rim 1 as designated at 2, adjacent ends 6 and 7 are formed, and secured to the end 6 by rivets 8 is a pivotal mounting 9 bearing a pivot 10, said pivot 10 being horizontally mounted in an outwardly extending portion 11 which is formed on the mounting 9, said portion 11 being engaged in a slot 12 which is formed in the periphery of the rim 1.

Secured to the end 7 of the rim 1 is a pivotal mounting 13 which is secured to the rim by the rivets 14, said mounting 13 extending a distance under the end 6 of the rim and having a bearing portion 15 which extends into a slot 16 which is formed in the end 6 of the rim.

Mounted in the bearing portion 15 is a pivot 17, and connected to the pivots 10 and 17 of the pivotal mountings 9 and 13 respectively is a link 18, said link having an inwardly extending portion 19 formed or secured thereto adjacent the pivot 17 which is adapted to sidelap the felloe 4 of the wheel.

Formed in the portion 19 is a squared opening 20 which is for engagement with the squared end 21 of an operating tool 22.

In the operation of this improved device when secured to the split ends of a tire carrying rim as shown, the rim bearing the tire is removed from the felloe 4 of the wheel after the securing members 5 have been removed, then the engaging end 21 of the tool 22 is inserted in the squared opening 20 of the extending or radially extending portion 19, the position of introducing the tool being that shown in dotted lines in Fig. 1 of the drawings; then pressure is brought to bear downwardly on the tool in a right hand direction bringing the tool to the position shown in dotted lines in Fig. 2, which movement caused the link 18 to be swung downwardly from the pivot 10, wherein the portion 19 engaged against the inner periphery of the rim 1 as shown in said Fig. 2. This downward movement of the link caused the end 7 of the rim to underlap the end 6, thereby reducing the peripheral diameter of the rim so that the tire can be easily removed therefrom.

To enhance the manipulation of the link it is to be noted that the lever operating tool 22 has a right angular bent shaped portion 23 in which the introduction of the tool will be at right angles to the handle part of the tool. This construction of tool relative to the disposition of the squared opening of the portion 19 allows a swinging movement to be carried on outside of the outer side edge 24 of the rim 1 so that there will be no jamming of the tool like there would be if the tool was adapted to be manipulated and swung within the inner periphery of the rim.

Attention is called to the radially projecting portion 19 which extends adjacent one of the side faces of the felloe of the wheel, said portion providing means for forming the squared opening therein, and so that the hinge 18 and pivotal mountings 9 and 13 thereof can be made relatively thin so that they lie within the annular space 25 provided between the outer periphery of the felloe and the inner periphery of the tire carrying rim, which construction of contracting and expanding attachment can be applied to any tire carrying rim without cutting into the wheel felloe.

In expanding the rim from its contracted position after a new tire has been mounted thereon, the operating tool 22 is inserted in the squared opening 20 of the link 18 in the position shown in Fig. 2, said tool then being swung in a left hand direction to the position shown in Fig. 1.

What I claim is:

1. A tire rim being split so as to provide ends thereto which are adapted to overlap, a link pivotally connected to each of said ends of said rim, and a radially projecting offset portion extending from said link adjacent one of the pivots thereof having a flat sided opening formed therein for the reception of an operating tool.

2. A one piece transplit tire rim having a link secured to the inner periphery thereof, and there being pivotal mountings for the ends of said link, said rim being provided with a pair of openings, each of which is for the reception of a respective pivotal mounting of said link, and an angularly arranged offset portion adapted to overlap the outer face of a wheel felloe when the rim is mounted thereover, extending from one side of said link and having a wrench engaging opening formed therein for the reception of an operating tool.

3. A one piece transplit tire rim having a link secured to the inner periphery thereof, said link being pivotally connected to said rim adjacent respective ends thereof, and an angularly arranged off-set portion adapted to over lap the outer face of a wheel-felloe extending from said link provided with means for engaging an operating tool thereto.

ALBERT C. HOECKER.